Nov. 8, 1955     C. W. CLAPP     2,723,350
APPARATUS FOR DETERMINING THE MASS PER
UNIT AREA CHARACTERISTICS OF MATERIALS
Filed July 30, 1952     2 Sheets-Sheet 1

Inventor:
Charles W. Clapp,
by Paul A. Frank
His Attorney.

2,723,350
Patented Nov. 8, 1955

United States Patent Office

2,723,350

APPARATUS FOR DETERMINING THE MASS PER UNIT AREA CHARACTERISTICS OF MATERIALS

Charles W. Clapp, Scotia, N. Y., assignor to General Electric Company, a corporation of New York Application July 30, 1952, Serial No. 301,736

26 Claims. (Cl. 250—71)

The present invention relates to an apparatus for measuring the mass per unit area characteristics (i. e. thickness and/or density) of a material by determining the effect of the material on penetrative radiations with which the material is irradiated. More particularly, the invention relates to a new and improved measuring apparatus for use as either an X-ray thickness gage to obtain a measure of the thickness of an object, or, alternatively, as an X-ray photometer for obtaining an indication of the density of a material of known chemical composition.

It has long been known in the art that the amount of penetrative radiations, such as X-rays, which a material of given chemical composition will absorb or scatter, depends primarily upon the density and/or thickness of the material irradiated. Hence, if the density and composition of a material are known, then the thickness can be determined by measuring the intensity of the unabsorbed radiations passing through or scattered by the material, assuming that the intensity of the radiations with which the material is irradiated, is held constant. Likewise, if the thickness of a material of given chemical composition is known, and remains constant, then should the density of the material vary from a preselected standard, the intensity of the unabsorbed radiations passing through the material varies. By measuring the variation in intensity of the unabsorbed radiations then, the variation of its density from the desired standard can be detected.

There are a number of known apparatus which operate on the above principle to determine the mass per unit area characteristics of a material. For the most part, however, the known apparatus are somewhat complex in construction, and therefore are relatively expensive to manufacture and to install. Further, by reason of their design, the presently known measuring apparatus of this general type require some small amount of skill and training on the part of the operator. Consequently, they have not come into as widespread use as would otherwise seem feasible.

It is therefore one object of the present invention to provide an X-ray measuring apparatus of the above described type which is simple in design, and relatively inexpensive to manufacture.

A further object of the invention is to provide a new and improved direct reading measuring apparatus having the above set forth characteristics which is easy to install, and can be operated by relatively unskilled personnel having little or no scientific training.

The invention in its preferred form utilizes a beam of X-rays in which is placed the material whose mass per unit area characteristic (i. e. thickness and/or density) is to be determined. The unabsorbed radiations passing through the material, or the backscattered radiations from the surface of the material are applied to detector means which produces a signal responsive to the intensity of the radiations. This signal is utilized to control the energization of the X-ray tube so as to maintain the intensity of the radiations reaching the same, at a substantially constant value. As a result, the voltage applied to the X-ray tube is varied in direct relation with the mass per unit area characteristics of the material, and consequently, may be used as a measure of the thickness or density of the material. This voltage is then applied through a suitable correction circuit means to an indicator which produces a perceptible indication of the thickness and/or density of the material.

Other objects, features, and many of the attendant advantages of this invention will be appreciated more readily as the same becomes better understood by reference to the following detailed description when considered in connection with the accompanying drawings, wherein like parts in each of the several figures are identified by the same reference character, and wherein.

Figure 1:
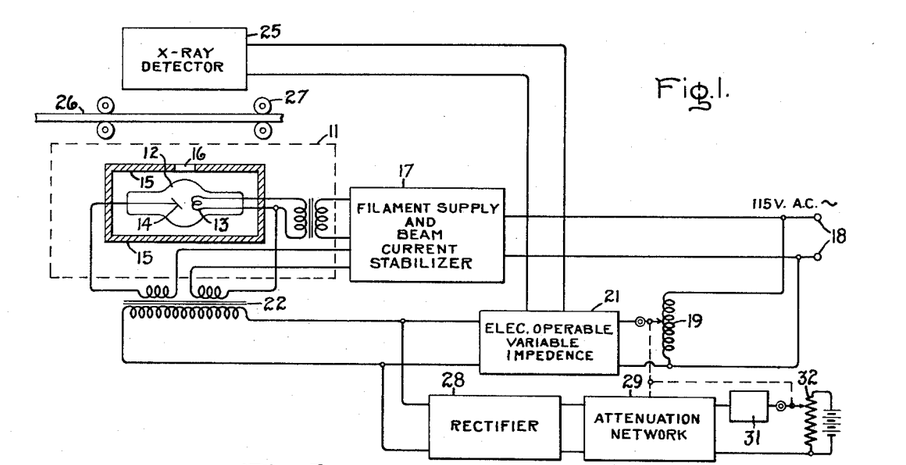
Fig. 1 is a schematic block diagram of a new and improved transmission type measuring apparatus constructed in accordance with the invention, and illustrates the physical and electrical relationship of the various component elements of the apparatus.

The new and improved measuring apparatus for determining the mass per unit area characteristics of a material illustrated in Fig. 1, is designed primarily for use as a transmission type, thickness measuring gage, and comprises a preferred embodiment of the invention. The apparatus includes a controllable means 11 for producing penetrative radiations which preferably comprises an X-ray tube 12 of standard construction having a directly heated cathode filament 13, and an anode 14 positioned within a suitable envelope. The X-ray tube 12 is physically enclosed within an X-ray shielding means 15 having an aperture 16 therein for forming the X-rays produced by tube 12 into what is generally termed as a "directional, beam of X-rays," and is electrically coupled to a controllable energization circuit for energizing the X-ray tube, and controlling the intensity of the X-rays produced thereby. While the source of penetrative radiations has been described as preferably comprising an X-ray tube 12, it should be noted that some other controllable source of penetrative radiations might be used equally well to provide the measuring radiations. For example, a source of ultra-violet light could be inserted in place of X-ray tube 12, and the hereinafter described apparatus used to measure the comparative density of gases exhibiting ultra-violet light absorption characteristics. Other such examples will be suggested to those skilled in the art, in the light of the following disclosure.

Referring again to the controllable energizing circuit for energizing X-ray tube 12, that circuit preferably comprises a filament supply and beam current stabilizing circuit means 17 having the output thereof connected across the cathode filament 13 of X-ray tube 12, and the input thereof connected to a source 18 of regulated, alternating current. The controllable energization circuit may also further include a voltage regulating means that comprises a manually operable voltage controller 19 and an electrically controllable variable impedance 21 coupled in the energization circuit for controlling the anode-cathode voltage supplied to the X-ray tube. In the preferred embodiment of the invention, the manually controllable voltage controller may comprise an adjustable transformer connected across the cource of alternating current supply 18, and the electrically controllable variable impedance 21 is connected between the output of the adjustable transformer and the primary winding of a voltage step-up transformer 22 having the secondary winding connected across the anode and cathode of X-ray tube 12. With this arrangement, the anode-cathode voltage of the X-ray tube can be controlled with either the adjustable transformer 19, or with the electrically operable variable impedance 21, while the beam current of the tube is maintained essentially constant by the filament supply and beam current stabilizer 17. Since it is a well known characteristic of substantially all X-ray tubes that, with a constant beam current, the intensity of the X-rays produced by the tube is dependent primarily upon the value of the anode-cathode voltage applied to the tube, it can be readily appreciated that the adjustable transformer 19 and electrically operable variable impedance 21 serve to control the intensity of the X-rays produced by the tube.

For the purpose of deriving an indication of the mass per unit area of a given material, the new and improved measuring apparatus further includes a radiation detector means 25 having its output electrically coupled to the electrically operable variable impedance 21, and physically disposed adjacent X-ray tube 12 with the area intermediate the detector 25 and X-ray tube 12 (i. e. shield 15) adapted to receive a sample 26 of the material to be examined. By reason of the above-described construction, the radiation detector means 25 serves to develop an output signal which is indicative of the intensity of the X-rays emitting from the material 26. In the embodiment of the invention shown in Fig. 1, the emitted X-rays in question comprise those unabsorbed X-rays that have passed through the sample of material, and in the embodiment of the invention illustrated in Fig. 5, (to be described more fully hereinafter) the emitted X-rays are comprised of those X-rays backscattered by material 26. In order to utilize the control signal thus developed, the output of detector means 25 is coupled back to the input of the electrically operable variable impedance 21 in proper phase relationship so that the signal produced thereby controls the action of the variable impedance in a manner to maintain the intensity of the X-rays reaching the detector 25 substantially constant.

With regard now to the theory of operation of the new and improved measuring apparatus, it has long been known in the art that the amount of penetrative radiations which a material of known composition will absorb or scatter depends primarily on the mass per unit area characteristics of the material (i. e., density and thickness). Hence, if the intensity of radiations emitted by an arrangement such as that shown in Fig. 1 were held constant, the intensity of radiations reaching the detector 25 of the arrangement would be indicative of the X-ray absorption or mass per unit area characteristics of the material 26. This information could then be interpreted as a measure of the thickness of the material, the density of the material, an indication of the existence of flaws such as voids in the material, or to determine the presence of foreign particles having different radiation absorption characteristics from the material being gaged.

Substantially all of the known measuring apparatus of the same general class as that of the present invention, utilize the above briefly-described technique to derive measurements of the thickness or density of samples of material. However, instead of maintaining the intensity of the radiations emitted by the radiation producing means constant, in the present invention the intensity of the radiations reaching the radiation detector means 25 is held constant, for applicant has determined that if such conditions are maintained, then the variations in excitation energy (i. e., anode-cathode voltage of the X-ray tube) are substantially linearly proportional to the desired mass per unit area characteristic of the material. Hence, by detecting the variations in energization of the radiation-producing means, an output signal can be obtained which is representative of the mass per unit area characteristics of the material thereby to provide an indication of the thickness or density of the material, or of the existence of flaws or foreign particles.

In order to detect the variations in energization of the radiation-producing means, an output circuit means is provided which includes a rectifier means 28 having its input connected across the primary winding of supply transformer 22, and its output coupled through an attenuation network 29 to an indicator 31. The attenuation network 29 serves to attenuate the signal derived by rectifier 28 by an amount determined by the adjusted intensity of the X-rays produced by X-ray tube 12, determined by the setting of the variable transformer 19, so that a signal is produced at the output of the attenuation network which is linearly proportional to the mass per unit area characteristics of the material 26. In order to facilitate measurement of the signal obtained from the output of attenuation network 29, the signal is fed to indicator 31 along with a reference signal obtained from an adjustable potentiometer 32, and having a value equal to the value of the signal that would be obtained from attenuation network 29 if the material 26 had a thickness of a desired amount, or, if the thickness were known, then if the material had a desired density. By this arrangement, then, indicator 31 produces an indication of any deviation in the characteristics of the material 26 from a desired standard, and can be easily interpreted by relatively unskilled personnel having little or no scientific training.

Upon the above-described apparatus being placed in operation, the strip of material to be gaged is caused to run through the inspection area intermediate the X-ray shielding means 15 and radiation detector means 25 so that a penetrative beam of X-rays is directed against the material as it moves through the area. The intensity of the beam of X-rays is then reduced by an amount determined by the mass per unit area characteristics of the material so that the intensity of the unabsorbed X-rays reaching the radiation detector means 25 normally varies in accordance with the variations in such characteristics of the material. However, in the present gage the intensity of the X-rays reaching the radiation detector means is held constant, and the intensity of the beam of X-rays emitted by the X-ray tube 12 is continually varied in accordance with the mass per unit area characteristic of the material 26 by the electric signal derived from the radiation detector means 25, and coupled back to the energization circuit of X-ray tube 12 to control the action thereof. By detecting the variations in energization of the X-ray tube then, an output electric signal is derived which is representative of the mass per unit area characteristics of the material in question. This output electric signal can then be used in any desired manner, such as to control the operation of the machine manufacturing the material 26, to actuate a deviation indicator 31, to operate an alarm, or in some other fashion.

The above-discussed mode of operation holds true over a predetermined range of thickness or density values; however, the linearity of the apparatus falls off if it is operated over too great a range of emitted beam intensity levels extending on either side of some reference level. Consequently, it is desirable to provide some means for readily changing the reference intensity level of the emitted beam, and for this purpose the manually operable voltage controller 19 is included in the apparatus. For example, should it be desired to use the apparatus first to gage a material in the vicinity of one millimeter thick, and subsequently to use the same apparatus to gage a material six millimeters thick, the emitted beam reference intensity level can be easily changed by varying the position of the movable tap on variable tap transformer 19 and thereby adapt the apparatus for use in gaging the thicker material. Because the variable attenuation network 29 and the movable contact of potentiometer 32 are gang connected to the movable tap of variable ratio transformer 19, this one adjustment is all that is required to condition the apparatus for use with the new material. Hence, operation of the gage is further simplified since no elaborate alignment procedure is required in order to maintain the various elements of the apparatus in proper operating condition.

Figure 2:
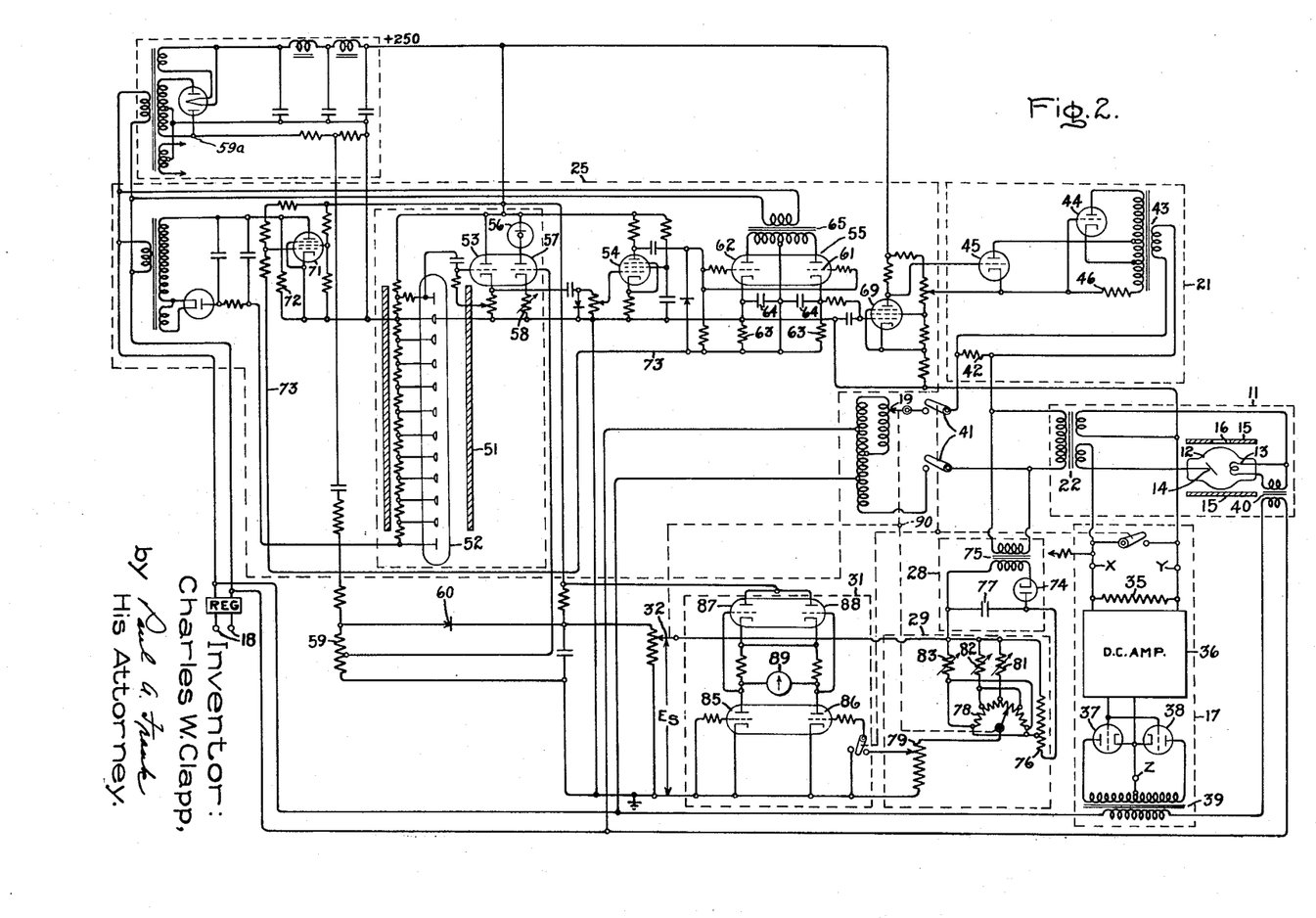
Fig. 2 is a schematic circuit diagram of the measuring apparatus illustrated in Fig. 1.

Fig. 2 shows a complete circuit diagram of the measuring apparatus, illustrated in Fig. 1 of the drawing, and discloses more fully the construction of the apparatus. As was described with relation to Fig. 1, the radiation-producing means 11 comprises X-ray tube 12 having cathode filament 13 and anode 14 for producing penetrative X-ray radiations that are formed into "a directional beam of X-rays" by an aperture 16 in an X-ray shielding means 15 surrounding the tube. The beam of X-rays thus formed, is directed through the material being gaged, so that the intensity thereof is reduced through absorption, and the unabsorbed X-rays passing through the material fall upon the radiation detector means 25. In order to control the intensity of X-rays produced by tube 12, the tube is coupled to a controllable energization circuit that includes the filament supply and beam current stabilizing circuit 17, and the anode-cathode voltage regulating means 19 and 21. For the purpose of simplifying the design of the apparatus, it is desirable that the intensity of the X-rays produced by tube 12, be controlled by simply varying the anode-cathode voltage applied to the tube; however, in order that anode-cathode voltage regulating means exercise substantially sole control over the intensity of the X-rays produced by the tube, the beam current of the tube must be maintained essentially constant. As the beam current of an X-ray tube is dependent primarily upon the temperature of the cathode filament, which is in turn dependent upon the value of heating current supplied to the cathode filament, it is necessary that the heating current supplied to the cathode filament of the tube be continually controlled so as to accomplish this result. For such purpose, the filament supply and beam stabilizing circuit 17 is included in the energization circuit means of X-ray tube 12.

Filament supply and beam current stabilizing means 17 comprises a resistor 35 connected between ground and a terminal of one of the windings of the split secondary winding of voltage step-up transformer 22 in the manner illustrated. Consequently, upon beam current flowing through the tube 12, such current is returned to ground through resistor 35, and a voltage is produced across resistor 35 which is dependent upon the value of the beam current flowing in tube 12. This voltage is applied to the input of a direct current amplifier 36 having its output connected to the control grids of a pair of differential load tubes 37 and 38. Differential load tubes 37 and 38 have their anodes connected to the input terminals of the secondary winding of a variable impedance transformer 39, and have the cathodes thereof connected in common to a midtap point on the said secondary winding. By this construction, load tubes 37 and 38 are rendered conductive during alternate half-cycles of the alternating current energy supplied to transformer 39, and by controlling the value of the conductance thereof, they can serve to vary the impedance that the secondary winding reflects into the primary winding of the transformer, in a manner similar to that of an electrically operable impedance described in U. S. Pat. No. 2,514,935—Clapp, issued July 11, 1950. To complete the arrangement, transformer 39 has its primary winding included in a power supply circuit interconnecting the source of alternating current 18 and the primary winding of a cathode filament supply transformer 40 which has its secondary winding connected in the cathode filament supply circuit of X-ray tube 12.

A more detailed description of the construction of D.-C. amplifier 36, and the manner of its operation can be obtained from an article published in the Review of Scientific Instruments, vol. 17, No. 4 entitled "The Stabilization of X-Ray Tube Current and Voltage"; however, it is believed sufficient to point out that the differential D.-C. amplifier 36 serves to compare the voltage obtained across resistor 35 to a reference potential having a value proportional to the desired X-ray tube beam current, and to derive an output signal indicative of the variation of the potential across 35 from its desired value. This output signal is then applied to load tubes 37 and 38 to vary the value of impedance that the transformer 39 reflects into the supply circuit interconnecting the source of alternating current 18, and the primary winding of transformer 40. Variation of the impedance reflected into this circuit by the transformer 39 therefore serves to vary the current flowing through cathode filament 13 of the tube so as to compensate for whatever change induced the original deviation from the desired beam current thereby to maintain the beam current of X-ray tube 12 constant.

The controllable energization circuit of the apparatus shown in Fig. 2 further includes a voltage regulating means that comprises the manually operable voltage controller 19 which is preferably an adjustable autotransformer having the input terminals thereof connected across the source of alternating current 18, and the output terminals thereof connected through an on-off switch 41 and a resistor 42 comprising a part of the electrically operable variable impedance 21, to the primary winding of voltage step-up transformer 22. By constructing the circuit supplying energy to X-ray tube 12 in this fashion, the on-off switch 41 provides a means for rendering X-ray tube 12 operative or inoperative, and variable transformer 19 provides a means for initially adjusting the intensity of the X-rays produced by X-ray tube 12 to some predetermined level.

The voltage regulating means of the controllable energization circuit further includes the electrically operable variable impedance 21 that includes the resistor 42 connected in parallel circuit relationship with the primary winding of an impedance matching transformer 43 having portions of the secondary winding thereof coupled across the anode and cathode of a pair of electron discharge devices 44 and 45. The circuit arrangement thus comprised constitutes an electrically operable variable impedance, the construction and operation of which is disclosed more fully in U. S. Patent 2,514,935, Clapp, issued July 11, 1950, and serves to vary the impedance reflected into the series circuit including adjustable autotransformer 19. Briefly, however, in operation an input control signal is applied to the control grid of the electron discharge device 45 and causes the same to be rendered conductive, whereupon plate current is caused to flow through the discharge device 45 during the positive half-cycles of the alternating voltage appearing across resistor 42. This current has an amplitude determined mainly by the value of the control signal applied to the control grid, and serves to produce a predetermined voltage drop across a resistor 46 included in the anode-cathode circuit of electron discharge device 45, and in the grid-cathode circuit of electron discharge device 44. Consequently, the conductance of electron discharge device 44 is controlled directly by the value of the control signal applied to the control grid of electron discharge device 45 and, as the impedance reflected by the circuit is proportional to the conductivity of the tube 44, this impedance will vary in accordance with the control signal applied to the control grid of discharge device 45. Because the variable impedance 21 is in series with the primary winding of the voltage step-up transformer 19, variations of this impedance will control directly the value of the anode-cathode voltage applied to X-ray tube 12. Hence, the control signal applied to the control grid of electron tube 45 (by radiation detector means 25) controls the value of the anode-cathode voltage applied to X-ray tube 12.

Disposed adjacent the X-ray tube 12 is the radiation detector means 25 with the area intermediate the X-ray tube and the detector means adapted to receive the material to be gaged, in the manner illustrated in Fig. 1. The radiation detector means 25 is similar in many respects to the radiation detector circuits disclosed in U. S. Patent 2,467,812—Clapp, issued April 19, 1949, and preferably comprises a phosphorescent material coated member 51 disposed in a manner such that the unabsorbed X-rays from X-ray tube 12 impinge thereon after passing through the material being gaged. The phosphorescent material coated material 51 is sensitive to radiations having a wavelength in the vicinity of the wavelength of the X-rays produced by the X-ray tube 12, and serves to convert the X-rays into visible light. The visible light thus produced impinges upon a photocell unit 52 of the photomultiplier type which serves to convert the visible light signal into a varying electric signal indicative of the intensity of the X-rays. In order to utilize the electric signal derived by photocell 52, the anode of the photocell is operatively coupled through two stages of amplification comprising a cathode-follower 53, and pentode amplifier 54 to the input of a peak comparator circuit 55.

Photocell unit 52 is also susceptible to light produced by a reference source of illumination comprising a gas discharge tube 56 that is adapted to be illuminated only during the alternate half-cycles of the alternating current supply when X-ray tube 12 is not conducting. For this purpose gas tube 56 is connected in the plate circuit of a triode amplifier 57 having a variable resistor 58 connected to the cathode circuit thereof for controlling the intensity of the light produced by gas tube 56, and has the control grid thereof connected across an impedance 59. Impedance 59 comprises a resistor that is connected between ground and one terminal 59a of the secondary winding of a transformer coupled across the source of alternating current 18 in a manner such that the point of connection of the control grid of triode 57 is driven positive during the alternate half cycles that X-ray tube 12 is not conducting. Hence, gas tube 56 will be illuminated during such alternate half cycles.

In order to maintain the illumination produced by gas tube 56 somewhat constant so that it serves as a suitable reference source, a clamping circuit is provided for assuring that the excitation potential applied to the tube is maintained substantially constant. This clamping circuit comprises a unidirectional conducting device 60 connected between one terminal of impedance 59, and the stable, reference source of direct current potential comprised of potentiometer 32. Unidirectional conductive device 60 has the negative terminal thereof connected to potentiometer 32 and the positive terminal thereof connected to impedance 59 in a manner such that it is non-conducting except during the portion of the alternate half cycles when the potential developed across impedance 59 becomes sufficiently positive to overcome the positive bias applied from potentiometer 32. Upon the potential across impedance 59 reaching this value, device 60 becomes conductive, and serves to clamp or limit the value of the potential across impedance 59 so that it does not exceed that of the stable, reference direct current potential obtained across potentiometer 32. Hence, the control potential applied to the grid of triode 57 will never exceed some predetermined value, and this in turn assures that the excitation potential applied to gas tube 56 never exceeds the predetermined level. Then by proper adjustment of the value of the alternating potential developed across impedance 59 so that it always reaches the value of potential obtained from potentiometer 32, the excitation potential applied to gas tube 56 is maintained substantially constant thereby to maintain the intensity of illumination of the gas tube essentially constant.

By reason of the above construction, during the conducting half cycles of X-ray tube 12 when the tube is producing X-rays, electron discharge device 57 is non-conducting, and accordingly no illumination is given off by light source 56. However, during the non-conducting half-cycles of X-ray tube 12, when no X-rays are being produced thereby, a positive bias is applied to the control grid of discharge device 57, and causes the light source 56 to be illuminated. Hence, during alternate half-cycles of the voltage supplied from source 18, the photocell unit 52 is subjected to illumination from either the phosphorescent material coated member 51, or alternatively, from the light source 56 depending upon which one is activated. The photocell unit 52 therefore produces an electric signal in the form of a series of pulses that is coupled through the cathode follower 53 and pentode amplifier 54 to the peak comparator 55. In this series of pulses, the amplitude of alternate ones of the pulses is indicative of the intensity of the unabsorbed X-ray radiations reaching the phosphorescent member 51, and the amplitude of the intervening pulses is indicative of the intensity of illumination of light source 56.

The construction and theory of operation of the comparator circuit 55 is disclosed more fully in my U. S. Patent No. 2,467,812 identified above. Briefly, however, the comparator circuit includes a pair of electron discharge devices 61 and 62, each of which has a parallel resistor-capacitor network 63 and 64 connecting the cathode thereof to a common juncture, and has the anode thereof connected to a respective end terminal of the secondary winding of transformer 65 having the midpoint of the said secondary winding connected to the aforementioned common juncture. The primary winding of transformer 65 is coupled across the source of alternating current supply 18 in a manner such that during alternate half cycles of the alternating voltage supplied thereby, a positive potential is applied to the anode of either electron discharge devices 61 or electron discharge device 62. As was previously stated, the signal coupled to peak comparator circuit 55 from photocell unit 52 is of a pulsating nature, wherein alternate pulses are representative of the intensity of the unabsorbed X-rays impinging on phosphorescent member 51, and the intervening pulses are indicative of the intensity of the illumination of light source 56. By properly phasing the pulsating signal thus derived, one set of alternate pulses can be made to coincide with the positive half-cycles of the alternating voltage supplied from source 18, and the intervening set of pulses thereof can be made to coincide with the negative half-cycles of the voltage. The electron discharge devices 61 and 62 are therefore selectively rendered sensitive to the electric signals derived by photocell 52 which are indicative of the intensity of the unabsorbed X-rays reaching phosphorescent member 51, or the intensity of illumination of the reference source 56, respectively. Consequently, the discharge devices 61 and 62 serve to derive a voltage across their respective resistor-capacitor load circuits 63, 64 which is representative of either the intensity of the unabsorbed X-rays reaching the phosphorescent member 51, or the intensity of illumination of the reference light source 56.

In order to obtain an output signal from the peak comparator 55 which is indicative of a variation from standard in the mass per unit area characteristics of the material in question, the parallel resistor-capacitor load network 63 and 64 of electron discharge device 62 grounded on one side thereof, and the free side of the parallel resistor load network of electron discharge device 61 is coupled through a resistor-capacitor coupling circuit, and a direct current amplifier 69, to the control electrode of the electron discharge device 45. By connecting the circuit in this fashion, an input control signal is coupled to the control grid of electron discharge device 45 which is representative of the difference in voltages developed across the individual resistor-capacitor load networks 63, 64, and therefore is representative of the difference in intensity of the unabsorbed X-rays reaching the phosphorescent member 51, and the intensity of illumination of reference light source 56. If the intensity of illumination of light source 56 is maintained substantially constant, then, the input control signal fed to the control grid of electron discharge device 45 is indicative of the variations in intensity of the unabsorbed X-ray radiations reaching phosphorescent member 51, and can be attributed solely to variations from standard of the mass per unit area characteristics of the material being examined.

In order to assure that the variations in the input control signal applied to the control grid of electron discharge device 45 are due solely to variations from standard of the mass per unit area characteristics of the material irradiated, a means is provided for compensating any changes in the sensitivity of the photocell unit 52 due to variations in the energizing power supplied thereto, or other causes. This means comprises an electrically controllable variable impedance consisting of an electron discharge device 71 and a resistor 72 included in the power supply connection to the positive terminus of the photocell unit 52. The compensating means further includes a feedback connector 73 connected to the control grid of the electron discharge device 71, and to the juncture of the resistor-capacitor network 63, 64 of the electron discharge device 62. By this arrangement, as long as sensitivity of the photocell unit remains substantially constant, the voltage developed across the resistor-capacitor network of electron discharge device 62 and indicative of the intensity of illumination of reference light source 56, remains essentially constant. Hence, the signal fed back to the control grid of electron tube 71 will remain constant, and the impedance of the electrically controllable impedance comprised of electron tube 71 and resistor 72 will remain constant. Upon the sensitivity of the photocell varying from this constant value for any reason, such as a variation in the amplitude of the energizing power supplied thereto, the value of the signal developed across the resistor-capacitor network 63, 64 of discharge device 62, and fed back to the control grid of electron tube 71, likewise varies. The variation in value of this signal then serves to adjust the impedance coupled in the power supply circuit to photocell unit 52 by the electrically controllable variable impedance 71 and 72, in a direction to compensate for the variation in intensity of illumination of light source 56. Hence, the value of the control electric signal applied to the control grid of electron discharge device 45, does not vary with variations in sensitivity of photocell unit 52, but depends primarily only upon variations in the mass per unit area characteristics of the material being gaged.

From the foregoing description, it can be appreciated that a closed loop control or servo system is provided whereby a signal indicative of the intensity of the unabsorbed radiations passing through the material being gaged, is fed back to the energization circuit of the radiation-producing means to control the energization of such means. By properly phasing the control action thus derived so that, if the radiation absorption of the material being irradiated increases, the intensity of the radiations emitted by the source thereof is increased, and if the radiation adsorption of the material decreases, the intensity of the emitted radiations is decreased, the intensity of the unabsorbed X-rays reaching the radiation detector means 25 is maintained substantially constant. Then, in accordance with the theory previously set forth, while this condition is maintained the variations in anode-cathode voltage supplied to the X-ray tube 12 are approximately proportional to the variations in radiation absorption characteristic of the material being gaged, and consequently can be used as either a measure of the thickness of the material, or as an indication of a deviation in the density of the material.

In order to detect the variations in anode-cathode voltage of the X-ray tube 12, output circuit means are coupled across the energization circuit of the X-ray tube for deriving an output signal indicative of the desired physical characteristics of the material being irradiated. The preferred embodiment of the output circuit means shown in Fig. 2 includes a rectifier 28 that comprises a diode rectifying tube 74 having the cathode thereof connected to one terminal of the secondary winding of an input transformer 75, and the anode thereof coupled through a parallel resistor and capacitor load circuit 76 and 77 to the remaining terminal of the secondary winding of the input transformer. The primary winding of input transformer 75 is connected in parallel with the primary winding of the voltage step-up transformer 22 used to energize X-ray tube 12, and consequently, the voltage induced in the secondary winding is proportional to the anode-cathode voltage applied to the X-ray tube 12 to the energization of the X-rays with which the material being gaged is irradiated. This voltage is rectified by the diode rectifier 74, and results in the development of a D. C. voltage across the resistor-capacitor load circuit 76, 77, which is directly proportional to the anode-cathode voltage supplied to X-ray tube 12. In accordance with the previously discussed theory, this D. C. voltage is substantially linearly proportional to the desired physical characteristic, namely, thickness or density, and can be used as a measure of the thickness or density, and can be used as a measure of the thickness or density, depending upon which is the unknown factor.

Figure 3:
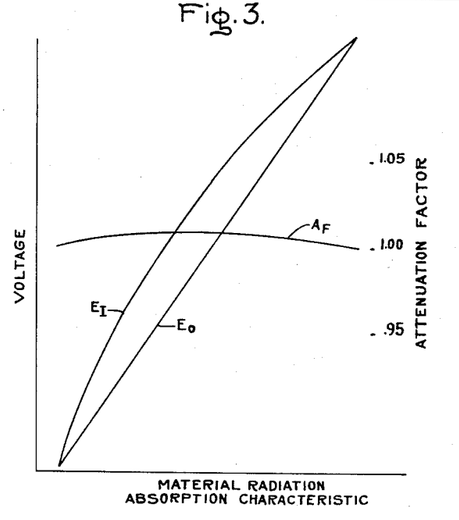
Fig. 3 is a graph illustrating the manner in which the output voltage derived from the measuring apparatus shown in Figs. 1 and 2 varies with the thickness of the material to be measured by the apparatus.

While the output signal derived from the rectifier 28 has been described as substantially linearly proportional to the variations in X-ray absorption characteristic of the material being irradiated, it has been empirically determined that this output signal does not follow a true linear relation with respect to the variations in the material X-ray absorption characteristic, but instead varies somewhat in the manner illustrated in the graph $E_1$ shown in Fig. 3 of the drawings. Consequently, if nothing more than what has already been described is used in the arrangement, it would be necessary to correct for this non-linear relationship by calculation after deriving the output signal $E_1$. However, because it is desirable that the material X-ray absorption characteristic be directly readable from the output of the apparatus, it appears more desirable automatically to compensate for the non-linear relationship of the output signal $E_1$ with respect to the material X-ray absorption characteristic, prior to presenting the same on an indicator means, such as 31 in Fig. 1. In order to convert the output signal $E_1$ to a signal such as that shown at $E_0$, then, it is necessary to attenuate the output signal $E_1$ by an amount determined by the graph $A_f$ shown in Fig. 3. The curve $A_f$ is a plot of the material radiation absorption characteristic versus the attenuation factor required over a predetermined range of radiation absorption characteristics.

One embodiment of an attenuation network which is suitable for use in linearizing the output of the rectifier 28 is shown at 29 in Fig. 2, and includes a first variable impedance or resistor 78 having the terminal points thereof short-circuited. The first variable resistor 78 has a movable contact connected through a second variable resistor 79 to a source of reference potential, and has a plurality of additional impedances or resistors connected in electrical circuit relationship therewith at points intermediate the short-circuited terminals thereof.

The plurality of additional impedances includes a first additional impedance 81 having one of the terminals thereof connected to a point intermediate the length of first variable impedance 78, and at least one other additional resistor 82, 83 or all, each having one of the terminals thereof connected in common with the remaining terminal of the first additional impedance 81, and having the remaining free terminals thereof connected at two points on the first variable impedance 78 at distances symmetrically spaced with relation to the point of connection of the first additional impedance 81. The common connection of the terminal points of the additional impedances 81 through 83 is connected to potentiometer 32 and to one terminal of load resistor 76, and therefore constitutes one input terminal of the attenuation network. The short-circuit terminals of the first variable impedance 78 constitute the other input terminal of the attenuation network, so that if a signal having a value located anywhere along the characteristic curve $E_i$ shown in Fig. 3, is applied thereacross, an output signal is obtainable from the movable contact of the variable impedance 78 which has a value given by the voltage characteristic curve $E_o$ shown in Fig. 3 at an abscissa corresponding to the abscissa of the value selected on the curve $E_i$.

Figure 4:
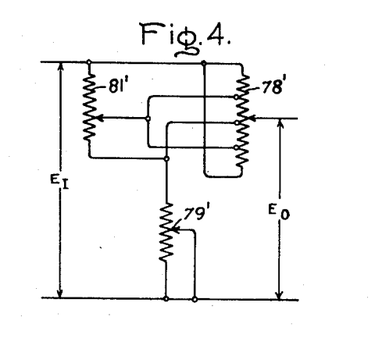
Fig. 4 is a schematic circuit diagram of an attenuation network that can be used to linearize the output voltage $E_1$ of the output circuit means to cause the same to follow along a characteristic curve that is linearly related to the mass per unit area characteristic of a material with which the apparatus is used.

A second embodiment of an attenuation network suitable for use in the present invention is illustrated in Fig. 4 of the drawings, and includes a first variable impedance or resistor 78' having the terminal points thereof short-circuited, and a second impedance 79', which may be variable if desired, connected in electrical series circuit relationship therewith. The input signal $E_i$ to be attenuated is then applied to the short-circuited terminals of the first adjustable impedance 78', and the free terminal of the impedance 79, and the desired linearized output signal $E_o$ can be obtained from the movable contact of the first variable impedance 78'. To further improve the response characteristic of the attenuation network thus comprised, additional impedances may be connected in the network. For this reason, each one of the additional impedances has a terminal thereof connected in common with the short-circuited terminals of the first variable impedance 78', with a remaining terminal of one of the additional impedances being connected to a point intermediate the length of the first variable impedance 78', and with the remaining terminals of the remaining additional impedances being connected to two points on the first variable impedance 78' at distances which are symmetrically located with respect to the point of connection of the first additional impedance.

With an attenuation network constructed in either of the two above described manners, with the value of the additional impedance 81' and the impedance 79 adjusted to obtain as closely as possible the attenuation characteristic shown in Fig. 3, and with the movable contact of the first variable impedance 78 gang connected through a mechanical interconnection 90 in common with the movable contact arm of the manually operable voltage controller 19, the network attenuates an input signal by an amount such that a desired output signal is obtained from the movable contact of the variable impedance 78 which is linearly proportional to the X-ray absorption characteristics of a material being gaged. That either of the attenuation network indeed produces this result is believed obvious from an inspection of the networks wherein it is readily seen that, with the gage dial of the apparatus, and therefore the movable contact of 78 set at either its highest or lowest X-ray radiation absorption setting, the attenuation factor for the network is simply unity. By inspection of Fig. 3, it can be seen that this is the desired result at the particular settings in question, since the value of the output voltage at each of the particular points in question on the characteristic curve $E_o$ were chosen to coincide with the value of the input voltage at the corresponding points on the characteristic curve $E_i$. With the gage dial and therefore the movable contact of variable impedance 78 set at its midposition, the attenuation through the network is a maximum, and has a value determined mainly by the setting or value of impedance 79. At the ¼ and ¾ settings of the gage dial, the attenuation factor has some value, determined by the value of additional impedances 81, 82, 83, etc. connected in the manner shown. The networks, therefore, are capable of delivering an output voltage which exactly matches the desired linear voltage characteristic curve $E_o$ illustrated in Fig. 3 at the two end points of variable impedance 78', and at three or more interior points, depending upon the symmetry of the required attenuation curve. For curves of the type generally encountered in measuring apparatus of this nature, the departure at other points of the material radiation absorption range is small enough to be neglected.

In order to measure the output voltage $E_o$, and convert the same into an indication that can be conveniently interpreted, the present embodiment of the invention utilizes a deviation indicator 31 which may comprise a differential amplifier circuit arrangement including a plurality of electron discharge devices 85, 86, 87 and 88, and a moving coil, galvanometer type of indicating instrument 89 interconnected therewith. A more detailed description of the construction and manner of operation of the deviation indicator may be obtained in an article entitled, "Increasing Vacuum-Tube Volt-Ohmmeter Sensitivity," and appearing in the February 1945 issue of Q. S. T., vol. 29, page 35. For the purpose of the present disclosure it is believed sufficient to point out that any signal developed across the impedance 79 of attenuation network 29, is coupled directly to the control grid of electron discharge device 86, and produces an unbalance in the current flowing in plate load resistors of electron discharge devices 85 and 86, and is recorded by the deviation indicator meter 89.

In order to prevent a signal from appearing across the impedance 79 when the thickness of the material being irradiated is of the desired value, a reference signal is obtained from the source of reference potential 32, which preferably comprises a potentiometer, and is connected in series opposing relationship with the signal applied to the input of the attenuation network 29 by rectifier 28. With this arrangement, when the value of the signal derived by rectifier 28 ($E_i$) is such that an output signal $E_o$ is developed in the output of the attenuation network 29 which is equal to the reference signal obtained by potentiometer 32, the two signals balance out, and no voltage drop is produced across the impedance 79. Consequently, the control grid of the electron discharge device 86 in effect is held at zero reference potential along with the control grid of the electron discharge device 85, and there is no deviation indication by the meter 89. Upon the output signal derived by rectifier 28 deviating from the desired value, however, a voltage is developed across impedance 79 which has a value and sense dependent upon the amount and direction of deviation of the mass per unit area characteristics of the material being irradiated from its desired value, and accordingly produces an unbalance of the deviation indicator 31 which is proportional to such deviation. By simply reading the amount that meter 89 deviates from its reference position, then, an operator can determine precisely the amount that the material passing through the gage has deviated from its desired standard. In order to simplify operation of the apparatus and because the reference voltage obtainable across potentiometer 32 must necessarily be changed when it is desired to use the measuring apparatus with materials having different mass per unit area characteristics, the movable contact of potentiometer 32 is also gang connected in common with the movable contact of the manually operable voltage controller 19, and with the movable contact of the manually controllable attenuation network 29. The common control station for all three elements of the apparatus therefore may be used to adjust the apparatus to measure materials of varying mass per unit area characteristics, and for convenience may be calibrated in units of thickness and/or density, depending upon which characteristic is to be measured.

In operation, the radiation producing means 11 of the apparatus is mounted on one side of the material to be gaged, and the radiation detector means 25 is mounted on the opposite side of the material, in a manner such that radiations produced by the means 11 pass through the material to be gaged, and the unabsorbed radiations thereof impinge upon the detector means 25. The radiation producing means 11 is then energized by the energization circuit including filament supply and beam current stabilizing means 17, and an anode-cathode voltage regulating means comprising electrically operable variable impedance 21, and manually operable voltage controller 19. The manually operable voltage controller 19 is roughly adjusted to produce a desired X-ray beam intensity determined by the average value of the mass per unit area characteristic of the material to be gaged, and the filament supply and beam current stabilizing means serves to maintain the beam current constant at the adjusted value, so that variations in intensity of the X-ray beam produced thereby thereafter depend primarily only upon the variations in anode-cathode voltage of the tube. The electrically operable variable impedance then serves to maintain the intensity of the X-rays reaching radiation detector means 25 substantially constant in the manner hereinbefore described, and in doing so necessarily have to vary the value of the anode-cathode voltage supplied to X-ray tube 12. The variations in the anode-cathode voltage of the X-ray tube are then detected by output circuit means including the rectifier 28, attenuation network 29, deviation indicator 31, and source of reference potential 32 which serve to derive an output indication that is representative of any deviation in the mass per unit area of the material being gaged from the desired standard. Because the adjusted intensity of the X-rays produced by tube 12 is determined mainly by the average value of the mass per unit area characteristics of the material being gaged, it is quite often necessary to readjust the intensity of the X-rays produced by tube 12 to a new average value. However, since the movable contact of the manually operable voltage controller 19 is gang connected in common with the movable contacts of the manually controllable attenuation network 29, and with the movable contact of the reference potentiometer 32, all that is required when readjusting the gage for use with a material having a different average value of mass per unit area, is that one common control be operated. This feature then greatly simplifies operation of the apparatus, so that relatively unskilled persons having little or no scientific background can operate the gage. Further, since only one beam of X-rays is used in irradiating the material being gaged, and no additional beam is required for X-ray intensity regulation, only one X-ray radiation detector means, such as 25, is required, in contrast to previously known gages of the same general type which require at least two detectors. Consequently, the cost of manufacture of the gage is greatly reduced. Also, since only one radiation detector means is used in the apparatus, the connecting circuitry required properly to utilize the output of the detector means is simplified, and this feature further simplifies the construction of the apparatus, as well as reduces its cost.

Figure 5:
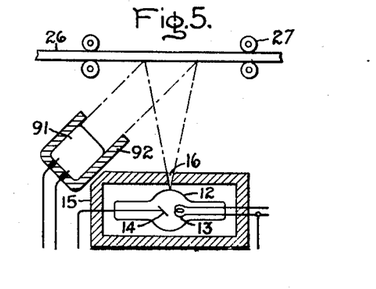
Fig. 5 is a schematic block diagram of a back-scattering (i. e. radiation reflecting) type of measuring apparatus embodying the principles of the present invention.

While the foregoing description has been concerned primarily with the disclosure of a transmission type of mass per unit area measuring gage utilizing penetrative radiations, it should be understood that the above-described arrangement is adapted to be readily incorporated into a backscattering type of gage wherein the arrangement utilizes the component of penetrative radiations backscattered by a material being irradiated, to determine its mass per unit characteristics. Figure 5 of the drawings discloses a suitable detecting head assembly which may be used in conjunction with the gage illustrated in Figs. 1 and 2 of the drawings to convert the same to a backscattering type of gage. The detecting head assembly shown in Fig. 5 includes a radiation producing means comprising an X-ray tube 12 surrounded by an X-ray shielding means 15, and adapted to be connected in an energization circuit in a manner identical to that in which the correspondingly numbered elements of the X-ray radiation producing means of the gage shown in Figs. 1 and 2. By this construction, X-ray tube 12 can be made to produce X-ray radiations which are formed into a directional beam by the aperture 16 in the shielding means 15, and this beam of X-rays directed against the material 26 to be gaged. Because it may be impossible to mount a radiation detector on the side of material 26 opposite from X-ray tube 12 in order to measure the unabsorbed radiations passing through the material, in the backscatter type of gage the radiation detector means 91 is located on the same side of material 26 as the X-ray tube 12, and serves to derive an output electric signal indicative of the intensity of such backscattered X-ray radiations. As was previously set forth in the specification, the amount of penetrative radiations which a material of known chemical composition will absorb or scatter depends primarily on the density of the material and its thickness. Hence, the output electric signal developed by the radiation detector means 91 may be used as an indication of the mass per unit area characteristics of the material. The radiation detector means 91 may comprise an ionization chamber, or some other suitable detector device, located within an X-ray radiation shielding means 92 for preventing direct radiations from X-ray tube 12 from reaching ionization chamber 91, and allowing backscattered radiations from material 26 to impinge on the chamber. The output of ionization chamber 91 may then be connected to the electrically operable variable impedance 21, and the signal developed thereby used to control the operation of the variable impedance in the previously described manner. As the operation of a measuring gage incorporating the detecting head assembly shown in Fig. 5, is similar in every respect to the operation of the gage shown in Figs. 1 and 2, a further description of the operation of such modification of the gage is not believed to be necessary.

In addition to the above-described specifically disclosed methods of gaging and structures, other modifications and variations are possible in the light of the present teachings. It is therefore to be understood that changes may be made in the specific forms of the invention disclosed which are within the full intended scope of the invention as defined by the appended claims.

What I claim as new and desire to secure by Letters Patent of the United States is:

1. The method of determining the mass per unit area characteristics of a material which comprises irradiating the material with penetrative radiations, deriving a control signal indicative of the intensity of the radiations emitting from said irradiated material, controlling the energization of said penetrative radiations with the control signal thus derived to maintain the intensity of the radiations emitting from the irradiated material substantially constant, and utilizing the variations in energization of the penetrative radiations to produce an output signal representative of the mass per unit area characteristics of the material irradiated.

2. The method of determining the radiation absorption characteristics of a material which comprises irradiating the material with penetrative radiations, deriving a control signal indicative of the intensity of the unabsorbed radiations passing through said irradiated material, controlling the energization of the penetrative radiations with the control signal thus derived to maintain the intensity of the unabsorbed radiations substantially constant, and utilizing the variations in energization of the penetrative radiations to produce an output signal representative of the radiation absorption characteristics of the material irradiated.

3. The method of determining the mass per unit area characteristics of a material which comprises irradiating the material with penetrative radiations, deriving a control signal indicative of the intensity of the radiations scattered from said irradiated material, controlling the energization of said penetrative radiations with the control signal thus derived to maintain the intensity of the scattered radiations reaching said control signal deriving means substantially constant, and utilizing the variations in energization of said penetrative radiations to produce an output signal representative of the mass per unit area of the material irradiated.

4. The method of determining the mass per unit area characteristics of a material which comprises irradiating the material with X-rays, deriving a control signal indicative of the intensity of the X-rays emitting from said irradiated material, controlling the energization of said X-rays with the control signal thus derived to maintain the intensity of the X-rays emitting from the material substantially constant, and detecting the variations in energization of said X-rays to produce an output signal representative of the mass per unit area characteristics of the material irradiated.

5. The method of determining the X-ray absorption characteristics of a material by means of an X-ray producing device which comprises irradiating the material with X-rays from said X-ray producing device, deriving a control signal indicative of the intensity of the unabsorbed X-rays passing through said irradiated material, controlling the excitation voltage supplied to said X-ray producing device with the control signal thus derived while maintaining the current flow through said device substantially constant thereby to maintain the intensity of the X-rays reaching said control signal deriving means substantially constant, and detecting the variations in voltage supplied to said X-ray producing device to produce an output signal representative of the X-ray absorption characteristics of the material irradiated.

6. The method of determining the mass per unit area characteristics of a material which comprises irradiating the material with X-rays, deriving a control signal indicative of the intensity of the X-rays backscattered by said irradiated material, controlling the energization of said X-rays with the control signal thus derived to maintain the intensity of the backscattered X-rays reaching said control signal deriving means substantially constant, and detecting the variations in energization of said X-rays to produce an output signal representative of the mass per unit area characteristics of the material irradiated.

7. The method of determining the X-ray absorption characteristics of a material by means of an X-ray tube having an anode and a cathode which comprises irradiating the material with X-rays produced by said X-ray tube, deriving a control signal indicative of the intensity of the unabsorbed X-rays passing through said irradiated material, controlling the anode-cathode voltage supplied to said X-ray tube with the control signal thus derived while maintaining the anode current of said tube substantially constant thereby to maintain the intensity of the X-rays reaching said control signal deriving means substantially constant, detecting the variations in anode-cathode voltage supplied to said X-ray tube, and attenuating the signal thus obtained by an amount determined by the adjusted amplitude of the anode-cathode voltage supplied to said X-ray tube to thereby produce an output signal representative of the X-ray absorption characteristics of the material irradiated.

8. Apparatus for determining the mass per unit area characteristics of a material including in combination means for producing penetrative radiations for irradiating the material to be examined, detector means positioned to derive a control signal indicative of the intensity of the radiations emitting from the material, energizing means operatively coupled to said radiation producing means for energizing the same, control means operatively connected to said energizing means for controlling the intensity of the radiations produced thereby, said detector means being operatively coupled to said controllable energizing means to control the action of the same so that the intensity of the radiations reaching said detector means is maintained essentially constant, and output circuit means operatively coupled to said energizing means so as to be responsive to variations in the energization of said radiation producing means to produce an output signal representative of the mass per unit area characteristics of the material irradiated.

9. An apparatus for determining the radiation absorption characteristics of the material including in combination means for producing penetrative radiations for irradiating the material to be examined, radiation detector means disposed adjacent said radiation producing means with the space intermediate said radiation producing means and said detector means being adapted to receive the material to be examined whereby said radiation detector means serves to derive a signal indicative of the intensity of the unabsorbed radiations passing through the material, energizing means operatively coupled to said radiation producing means for energizing the same, control means operatively connected to said energizing means for controlling the intensity of the radiations produced thereby, the output of said detector means being operatively coupled to said controllable energizing means to control the action of the same thereby to maintain the intensity of the radiations reaching said detector means substantially constant, and output circuit means operatively coupled to said controllable energizing means so as to be responsive to variations in the energization of said radiation producing means to produce an output signal representative of the radiation absorption characteristics of the material irradiated.

10. An apparatus for determining the mass per unit area characteristics of a material including in combination means for producing penetrative radiations for irradiating the material to be examined, radiation detector means disposed adjacent the material to be examined on the same side thereof as said radiation producing means and exposed to penetrative radiations backscattered by said irradiated material, shielding means disposed intermediate said radiation detector means and said radiation producing means for rendering said detector means non-responsive to direct radiations from said radiation producing means whereby said radiation detector means serves to derive a signal indicative only of the intensity of the penetrative radiations backscattered by the material, energizing means operatively coupled to said radiation producing means for energizing the same, control means operatively connected to said energizing means for controlling the intensity of the radiations produced thereby, the output of said detector means being operatively coupled to said controllable energizing means to control the action of the same thereby to maintain the intensity of the backscattered radiations reaching said detector means substantially constant and output circuit means operatively coupled to said controllable energizing means so as to be responsive to variations in the energization of said radiation producing means to produce an output signal representative of the mass per unit area characteristics of the material irradiated.

11. An apparatus for determining the mass per unit area characteristics of a material including in combination an X-ray device to produce X-rays for irradiating the material to be examined, radiation detector means positioned to derive a control signal indicative of the intensity of the X-rays emitting from the irradiated material, energizing means operatively coupled to said X-ray device for energizing the same, control means operatively connected to said energizing means for controlling the intensity of the X-rays produced thereby, the output of said detector means being operatively coupled to said controllable energizing means to control the action of the same so that the intensity of the X-rays reaching said detector means is maintained substantially constant, and output circuit means operatively coupled to said controllable energizing means so as to be responsive to variations in the energization of said radiation producing means to produce an output signal representative of the mass per unit area characteristics of the material irradiated.

12. An apparatus for determining the X-ray radiation absorption characteristics of a material including in combination an X-ray tube having an anode and a cathode for producing X-rays to irradiate the material being examined, radiation detector means disposed adjacent said X-ray tube with the space intermediate said X-ray tube and said detector means being adapted to receive the material to be examined whereby the detector means serves to derive a control signal indicative of the intensity of the unabsorbed X-rays passing through the material, an energization circuit coupled to said X-ray tube for energizing the same, current stabilizing means coupled in said energization circuit for maintaining the anode current of said tube at a set value, voltage controlling means operatively coupled in said energization circuit for controlling the anode-cathode voltage supplied to said tube, the output of said detector means being operatively coupled to the input of said voltage controlling means for controlling the anode-cathode voltage of said X-ray tube with the control signal thus derived to thereby maintain the intensity of the radiations reaching said detector means substantially constant, and output circuit means operatively coupled to said energization circuit for detecting the variations in the anode-cathode voltage of said tube to thereby derive an output signal representative of the X-ray absorption characteristics of the material irradiated.

13. An apparatus for determining the mass per unit area characteristics of a material including in combination an X-ray tube having an anode and a cathode for producing X-rays to irradiate the material being examined, radiation detector means disposed adjacent the material to be examined on the same side thereof as said radiation producing means and exposed to penetrative radiations backscattered by said irradiated material, shielding means disposed intermediate said radiation detector means and said X-ray tube for rendering said detector means non-responsive to direct radiations from said X-ray tube whereby said radiation detector means serves to derive a signal indicative only of the intensity of the X-rays backscattered by the material, an energization circuit coupled to said X-ray tube for energizing the same, means coupled in said energization circuit for maintaining the beam current of said tube at a fixed value, voltage regulating means operatively coupled in said energization circuit for controlling the anode-cathode voltage supplied to said tube, the output of said detector means being operatively coupled to the input of said voltage regulating means for controlling the anode-cathode voltage of said X-ray tube with the control signal thus derived thereby to maintain the intensity of the backscattered X-ray radiations reaching said detector means substantially constant, and indicator means operatively coupled to said energization circuit for detecting the variations in the anode-cathode voltage of said tube thereby to derive an output signal representative of the mass per unit area characteristics of the material irradiated.

14. An apparatus for determining the X-ray radiation absorption characteristics of a material including in combination an X-ray tube having an anode and a cathode for producing X-rays to irradiate the material being examined, radiation detector means disposed adjacent said X-ray tube with the space intermediate said X-ray tube and said detector means being adapted to receive the material to be examined whereby the detector means serves to derive a control signal indicative of the intensity of the unabsorbed X-rays passing through the material, an energization circuit coupled to said X-ray tube for energizing the same, current stabilizing means coupled in said energization circuit for maintaining the anode current of said tube at a set value, voltage controlling means operatively coupled in said energization circuit for controlling the anode-cathode voltage supplied to said tube, the output of said detector means being operatively coupled to the input of said voltage controlling means for controlling the anode-cathode voltage of said X-ray tube with the control signal thus derived thereby to maintain the intensity of the radiations reaching said detector means substantially constant, output circuit means including a rectifier operatively coupled to said energization circuit for detecting the variations in the anode-cathode voltage of said tube, and an attenuation network coupled to said rectifier for attenuating the rectified signal produced thereby an amount determined by the adjusted intensity of the X-rays produced by said tube, thereby to produce an output signal representative of the X-ray absorption characteristics of the material irradiated.

15. An apparatus for determining the mass per unit area characteristics of a material including an X-ray producing device for producing penetrative radiations for irradiating the material to be examined, an energizing circuit coupled to said X-ray producing device for energizing the same and including electrically controllable variable impedance means coupled in said energizing circuit for regulating the energy supplied to said X-ray producing device thereby to control the intensity of the radiations produced by said device, radiation detector means positioned to produce an electric signal indicative of the intensity of the radiations emitting from the material being irradiated and having the output thereof coupled to said variable impedance for controlling the value of the impedance thereof in accordance with the intensity of the radiations reaching said detector means at a constant value, and output circuit means including a rectifier coupled across said energizing circuit for producing an output signal representative of the mass per unit area characteristics of the material being tested.

16. An apparatus for determining the X-ray absorption characteristics of a material including an X-ray producing device for producing penetrative radiations for irradiating the material to be examined, an energizing circuit coupled to said X-ray device for energizing the same and including an electrically controllable variable impedance coupled to said energizing circuit for regulating the energy supplied to said X-ray device to thereby control the intensity of the radiations produced by said device, radiation detector means disposed adjacent said X-ray producing device with the area intermediate said detector means and said X-ray device being adapted to receive the material to be examined, said detector means serving to derive a control electric signal indicative of the intensity of the unabsorbed radiations passing through said material, and having the output thereof coupled to said variable impedance for controlling the value of impedance thereof in accordance with the intensity of the X-rays reaching said detector means to thereby maintain the intensity of the radiations reaching said detector means at a constant value, and output circuit means including a rectifier coupled across said energizing circuit for producing an output signal representative of the X-ray absorption characteristics of the material being tested.

17. An apparatus for determining the X-ray absorption characteristics of a material including an X-ray tube having an anode and a cathode for producing penetrative radiations for irradiating the material to be examined, an energization circuit coupled to said X-ray tube for energizing the same, current stabilizing means coupled in said energization circuit for maintaining the anode current of said tube at a set value, voltage controlling means including an electrically controllable variable impedance coupled in said energization circuit for regulating the anode-cathode voltage supplied to said X-ray tube to thereby control the intensity of the radiations produced by said X-ray tube, radiation detector means disposed adjacent said X-ray tube with the area intermediate said radiation detector means and said X-ray tube adapted to receive the material to be examined, said detector means serving to derive a control electric signal indicative of the intensity of the unabsorbed X-rays reaching the radiation sensitive portion thereof, and having its output coupled to said variable impedance for controlling the value of impedance thereof in accordance with the intensity of the radiations reaching said detector means thereby to maintain the intensity of the radiations reaching said detector means at a constant value, and output circuit means including a rectifier coupled across said energizing circuit for producing an output signal representative of the X-ray absorption characteristics of the material being tested.

18. An apparatus for determining the X-ray radiation absorption characteristics of a material including an X-ray tube having an anode and a cathode for producing penetrative radiations for irradiating the material to be examined, an energization circuit coupled to said X-ray tube for energizing the same, current stabilizing means coupled in said energization circuit for maintaining the anode current of said tube at a set value, voltage controlling means including an electrically controllable variable impedance coupled in said energization circuit for regulating the anode-cathode voltage supplied to said X-ray tube thereby to control the intensity of the radiations produced by said X-ray tube, radiation detector means disposed adjacent said X-ray tube with the area intermediate said radiation detector means and said X-ray tube adapted to receive the material to be examined, said detector means serving to derive a control electric signal indicative of the intensity of the unabsorbed X-rays reaching the radiation sensitive portion thereof, and having its output coupled to said variable impedance for controlling the value of impedance thereof in accordance with the intensity of the radiations reaching said detector means to thereby maintain the intensity of the radiations reaching said detector means at a constant value, and output circuit means including a rectifier coupled to said energization circuit for detecting the variations in the anode-cathode voltage of said X-ray tube, and an attenuation network coupled to said rectifier for attenuating the rectified signal produced thereby an amount determined by the adjusted intensity of the X-rays produced by said tube, thereby to produce an output signal representative of the X-ray absorption characteristics of the material being tested.

19. An apparatus for determining the X-ray radiation absorption characteristics of a material including an X-ray tube having an anode and a cathode for producing penetrative radiations for irradiating the material to be examined, an energization circuit coupled to said X-ray tube and including a source of alternating electric potential for energizing said X-ray tube during alternate half cycles of the alternating electric potential, current stabilizing means coupled in said energization circuit for maintaining the anode current of said tube at a fixed value, voltage controlling means including a manually controllable voltage controller and an electrically controllable variable impedance coupled in said energization circuit for regulating the anode-cathode voltage supplied to said X-ray tube to thereby control the intensity of the radiations produced by said X-ray tube, radiation detector means comprising a phosphorescent material coated member disposed adjacent said X-ray tube, said phosphorescent member being sensitive to the unabsorbed X-rays emitting from the material irradiated for converting the same to visible light, a photocell unit disposed adjacent said phosphorescent member for deriving a control electric signal representative of the intensity of the X-ray radiations reaching the radiation sensitive portion thereof and having its output operatively coupled to said variable impedance for controlling the value of impedance thereof in accordance with the intensity of the radiations reaching said detector means thereby to maintain the intensity of the radiations reaching said detector means at a constant value, output circuit means including a rectifier coupled across said energizing circuit for detecting the variations in the anode-cathode voltage of said X-ray tube, a manually controllable attenuation network coupled to said rectifier for attenuating the rectified signal produced thereby an amount determined by the adjusted intensity of the X-rays produced by said tube thereby to produce an output signal representative of the X-ray absorption characteristics of the material being tested, and a common control station having the manually controllable voltage controller and said manually controllable attenuation network ganged thereto.

20. An apparatus for determining the X-ray absorption characteristics of a material including an X-ray tube having an anode and a cathode for producing penetrative radiations for irradiating the material to be examined, an energization circuit coupled to said X-ray tube for energizing the same, current regulating means coupled in said energization circuit for maintaining the anode current of said tube at a fixed value, voltage regulating means including a manually controllable voltage controller and an electrically controllable variable impedance coupled in said energization circuit for regulating the anode-cathode voltage supplied to said X-ray tube thereby to control the intensity of the radiations produced by said X-ray tube, radiation detector means disposed adjacent said X-ray tube with the area intermediate said detector means and said X-ray tube adapted to receive the material being examined, said radiation detector means serving to derive a control electric signal indicative of the intensity of the unabsorbed X-rays reaching the radiation sensitive portion thereof, and having its output coupled to said variable impedance for controlling the value of impedance thereof in accordance with the intensity of the radiations reaching said detector means thereby to maintain the intensity of the radiations reaching said detector means at a constant value, output circuit means including a rectifier coupled across said energizing circuit for detecting the variations in the anode-cathode voltage of said X-ray tube, an attenuation network coupled to said rectifier for attenuating the rectified signal produced thereby an amount determined by the adjusted intensity of the X-rays produced by said tube, said attenuation network including a first manually controllable variable resistor having the terminal points thereof short circuited, and a second resistor connected in electrical series circuit relationship with said first variable resistor, the output of said rectifier being coupled across the series circuit thus formed whereby the output signal obtainable from the movable contact of said first variable resistor is representative of the X-ray absorption characteristics of the material being tested, and a common control station having the manually controllable voltage controller and said manually controllable first variable resistor ganged thereto.

21. An attenuation network including a first variable impedance having the terminal points thereof short circuited, a second variable impedance connected in electrical series circuit relationship with said first variable impedance, and output terminal means operatively coupled to the movable contact of said first variable impedance.

22. An attenuation network including a variable impedance having the terminal points thereof short circuited, at least one additional impedance having one of the terminals thereof connected to a point on said variable impedance intermediate the terminal points of said variable impedance, the input signal to be attenuated being coupled across the remaining terminal of said additional impedance and the short-circuited terminals of said variable impedance, and output terminal means operatively coupled to the movable contact of said variable impedance.

23. An attenuation network including a first variable impedance, a second variable impedance, the adjustable contact of said first variable impedance being connected to a fixed terminal point of said second variable impedance, means short circuiting the terminal points of said first variable impedance, a first additional impedance having one of the terminal points thereof serially connected to a point intermediate the terminal points of said first variable impedance, at least one other additional impedance having one of the terminal points thereof connected to points on said first variable impedance that are symmetrically spaced with relation to the point of connection of said first additional impedance, the remaining terminal points of said first additional impedance and said other additional impedance being interconnected and comprising one input terminal for the network with the short circuited terminal points of said first variable impedance comprising the other input terminal of the network, and output terminal means operatively coupled to the movable contact of said first variable impedance.

24. An apparatus for determining the X-ray absorption characteristics of a material including an X-ray tube having an anode and a cathode for producing penetrative radiations for irradiating the material to be examined, an energization circuit coupled to said X-ray tube and including a source of alternating electric potential for energizing said X-ray tube during alternate half cycles of the alternating electric potential current stabilizing means coupled in said energization circuit for maintaining the anode current of said tube at a fixed value, voltage controlling means including a manually controllable voltage controller and an electrically controllable variable impedance coupled in said energization circuit for regulating the anode-cathode voltage supplied to said X-ray tube to thereby control the intensity of the radiations produced by said X-ray tube, radiation detector means comprising a phosphorescent material coated member disposed adjacent said X-ray tube, said phosphorescent member being sensitive to the unabsorbed X-rays emitting from the material irradiated for converting the same to visible light, a photocell unit disposed adjacent said phosphorescent member for deriving a control electric signal indicative of the intensity of the X-rays reaching the radiation sensitive portion thereof, a reference source of illumination positioned adjacent the said photocell unit and adapted to illuminate the same, an energizing circuit for alternately energizing the reference source of illumination during the alternate half cycles when the said X-ray tube is de-energized, said energizing circuit including an impedance coupled across said source of alternating electrical potential, a source of stable direct current reference electric potential, a first unidirectional conducting device coupling said impedance across said source of stable direct current electric potential and serving to clamp the potential across said impedance during alternate half cycles of said alternating potential so that the same is maintained substantially equal to the value of said stable reference direct current electric potential during such alternate half cycles, and a second unidirectional conducting device coupling the reference source of illumination across at least a portion of said impedance, both of said unidirectional conducting devices being adapted to be rendered conductive during the same alternate half cycles of said alternating electric potential a phase sensitive detector coupled to said photocell unit for deriving a control electric signal indicative of a variation from standard of the X-ray absorption characteristics of the material being examined, said phase sensitive detector having the output operatively coupled to said variable impedance for controlling the value of impedance thereof in accordance with the intensity of the radiations reaching said detector means to thereby maintain the intensity of the radiations reaching said detector means at a constant value, output circuit means including a rectifier coupled across said energizing circuit for detecting the variations in the anode-cathode voltage of said X-ray tube, a manually controllable attenuation network coupled to said rectifier for attenuating the rectified signal produced thereby an amount determined by the adjusted intensity of the X-rays produced by said tube, to thereby produce an output signal representative of the X-ray absorption characteristics of the material being tested, and a common control station having the manually controllable voltage controller and said manually controllable attenuation network ganged thereto.

25. In a penetrative radiation detector including a phosphorescent material coated member adapted to be disposed in an area being monitored for penetrative radiations and serving to convert the energy of such penetrative radiations into visible light, a photocell unit positioned adjacent the said phosphorescent member and adapted to be illuminated thereby, and a reference source of illumination positioned adjacent the said photocell unit and adapted to illuminate the same, the photocell unit being alternately exposed to illumination from the phosphorescent member and the reference source of illumination, the improvement of an energizing circuit for alternately energizing the reference source of illumination, said circuit comprising a source of alternating electric potential, an impedance coupled across said source of alternating electrical potential, a source of stable direct current reference electric potential, a first uni-directional conducting device coupling said impedance across said source of stable direct current electric potential and serving to clamp the potential across said impedance during alternate half cycles of said alternating potential so that the same is maintained substantially equal to the value of said stable reference direct current electric potential during such alternate half cycles, and a second unidirectional conducting device coupling the reference source of illumination across at least a portion of said impedance, both of said uni-directional conducting devices being adapted to be rendered conductive during the same alternate half cycles of said alternating electric potential.

26. An energizing circuit for alternately energizing a reference source of energy including in combination a source of alternating electric potential, an impedance coupled across said source of alternating electrical potential, a source of stable direct current reference electric potential, a first uni-directional conducting device coupling said impedance across said source of stable direct current electric potential and serving to clamp the potential across said impedance during alternate half cycles of said alternating potential so that the same is maintained substantially equal to the value of said stable reference direct current electric potential during such alternate half cycles, and a second unidirectional conducting device coupling the reference source of energy across at least a portion of said impedance, both of said unidirectional conducting devices being adapted to be rendered conductive during the same alternate half cycles of said alternating electric potential.

References Cited in the file of this patent

UNITED STATES PATENTS

| | | |
|---|---|---|
| 2,277,756 | Hare | Mar. 31, 1942 |
| 2,467,812 | Clapp | Apr. 19, 1949 |
| 2,503,075 | Smith | Apr. 4, 1950 |
| 2,587,697 | Conrad | Mar. 4, 1952 |